June 21, 1932.  A. P. D. BELANGER  1,864,178
DRIER FOR FOOD PRODUCTS
Filed Oct. 12, 1929  8 Sheets-Sheet 8
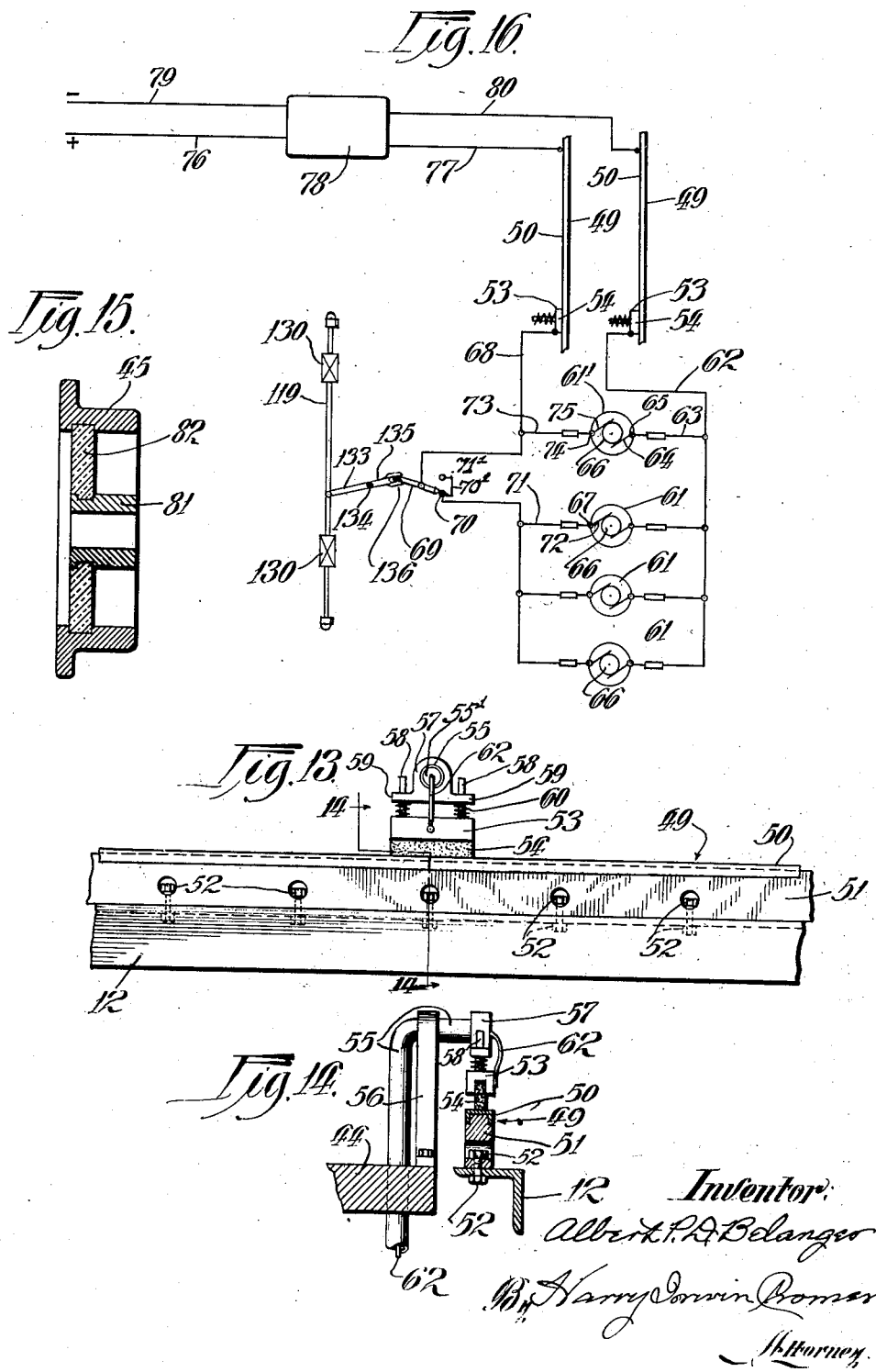

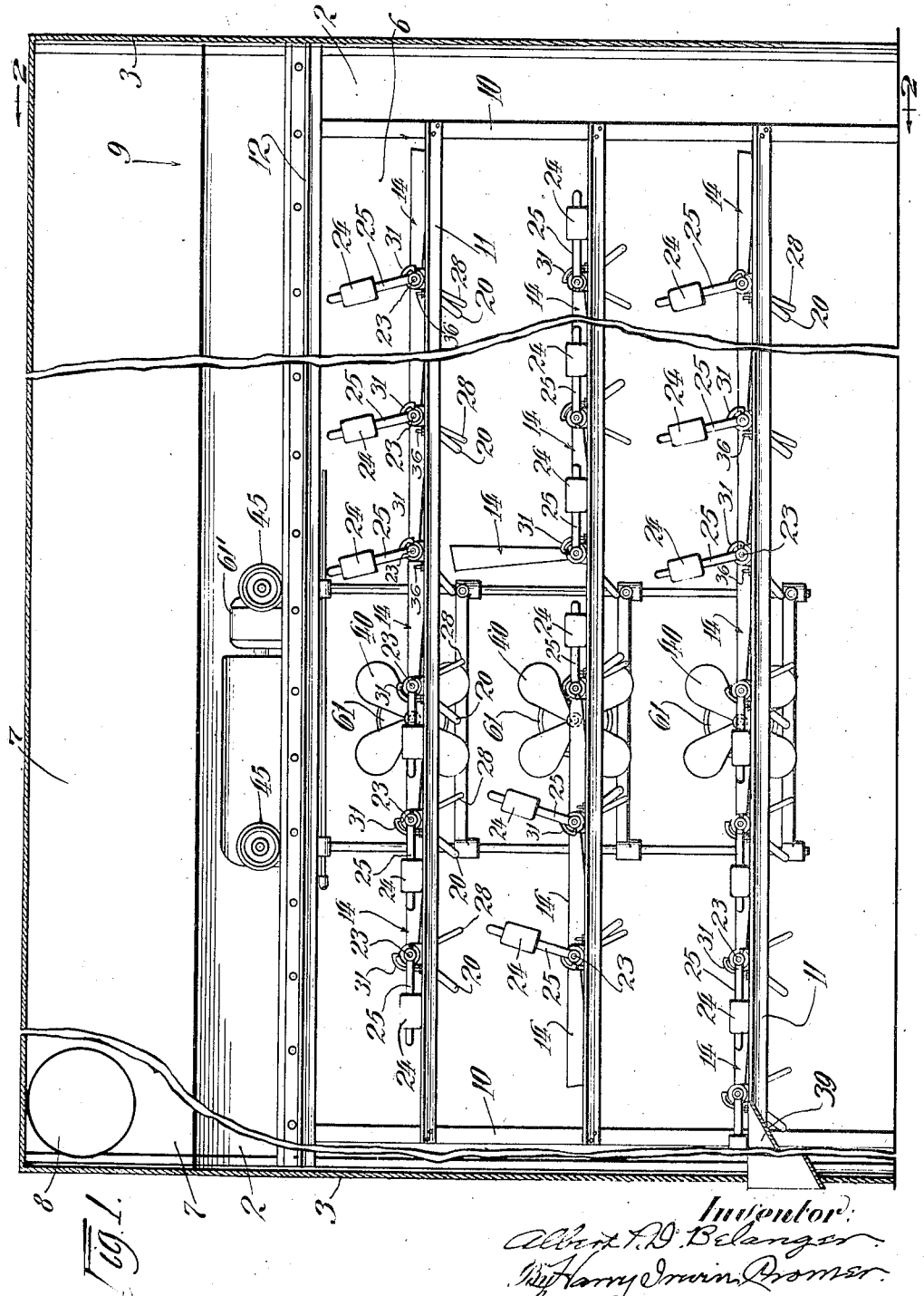

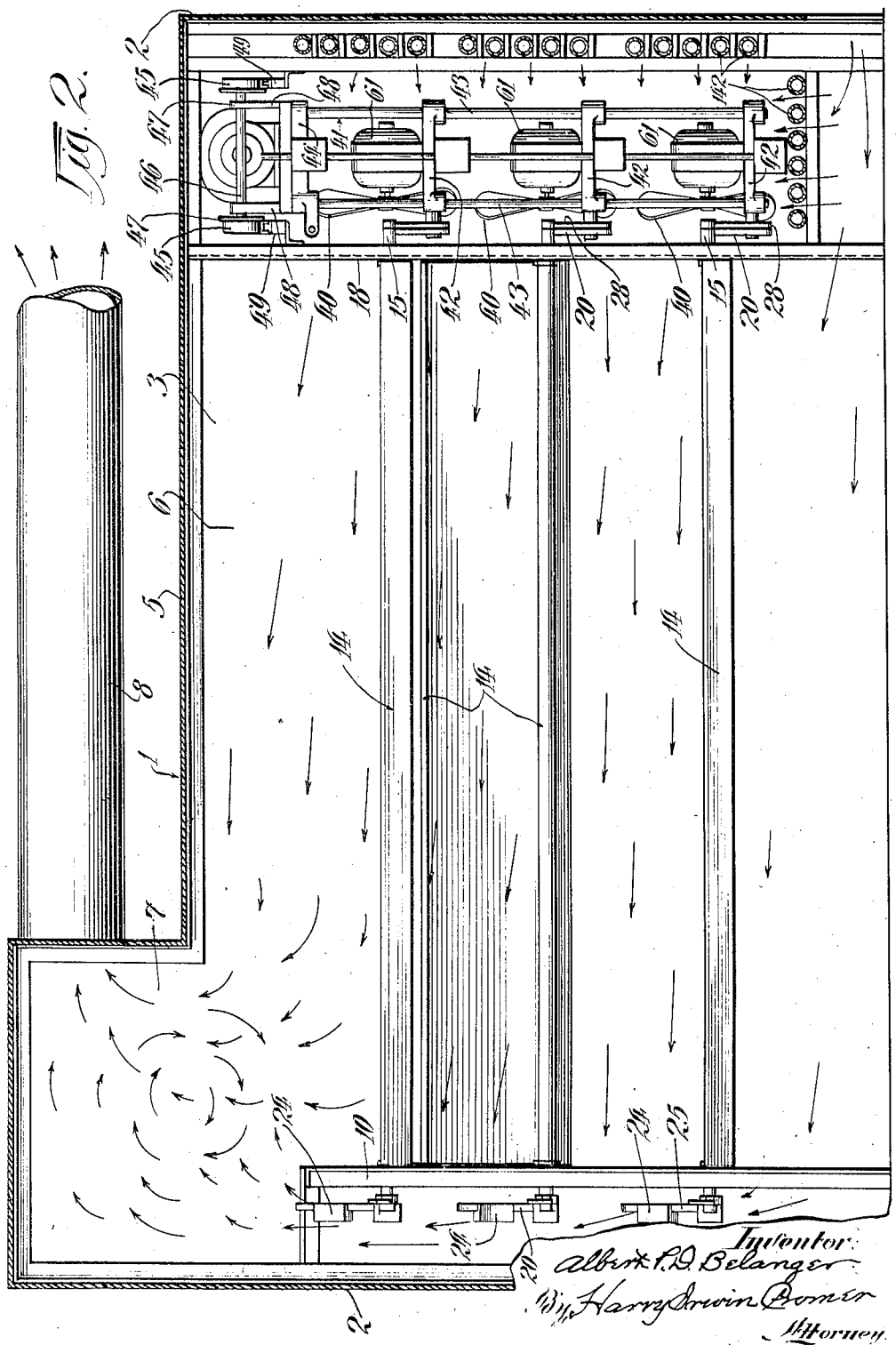

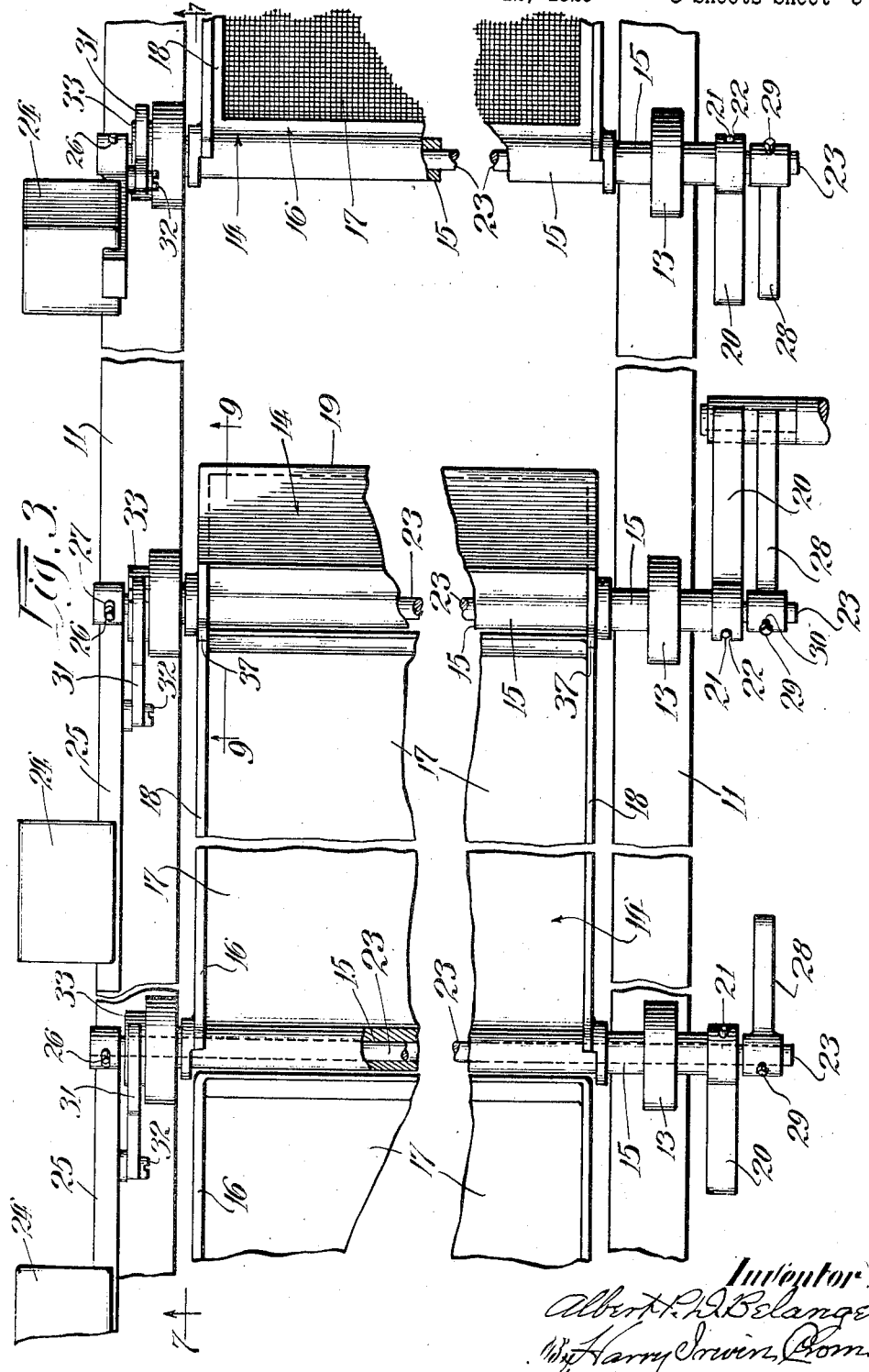

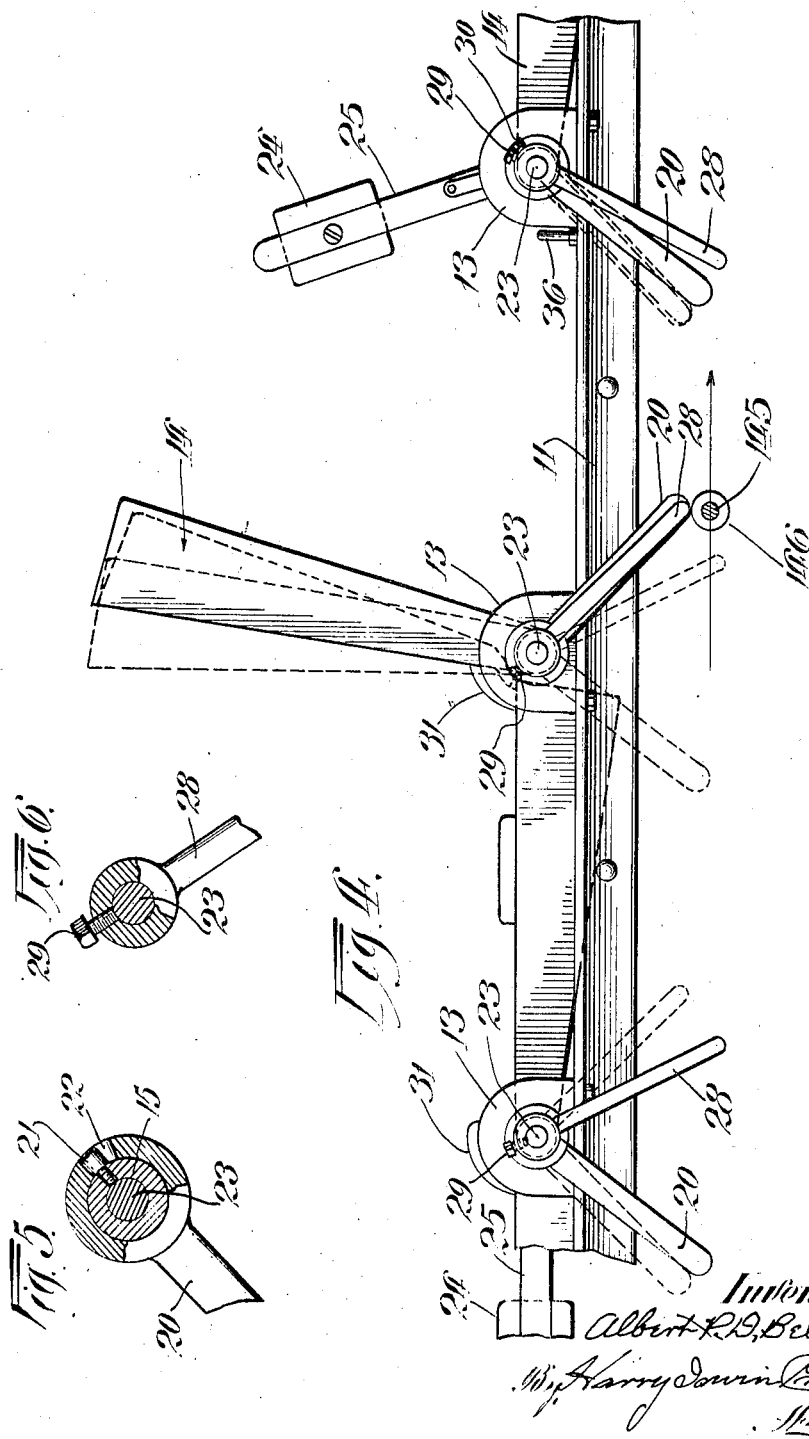

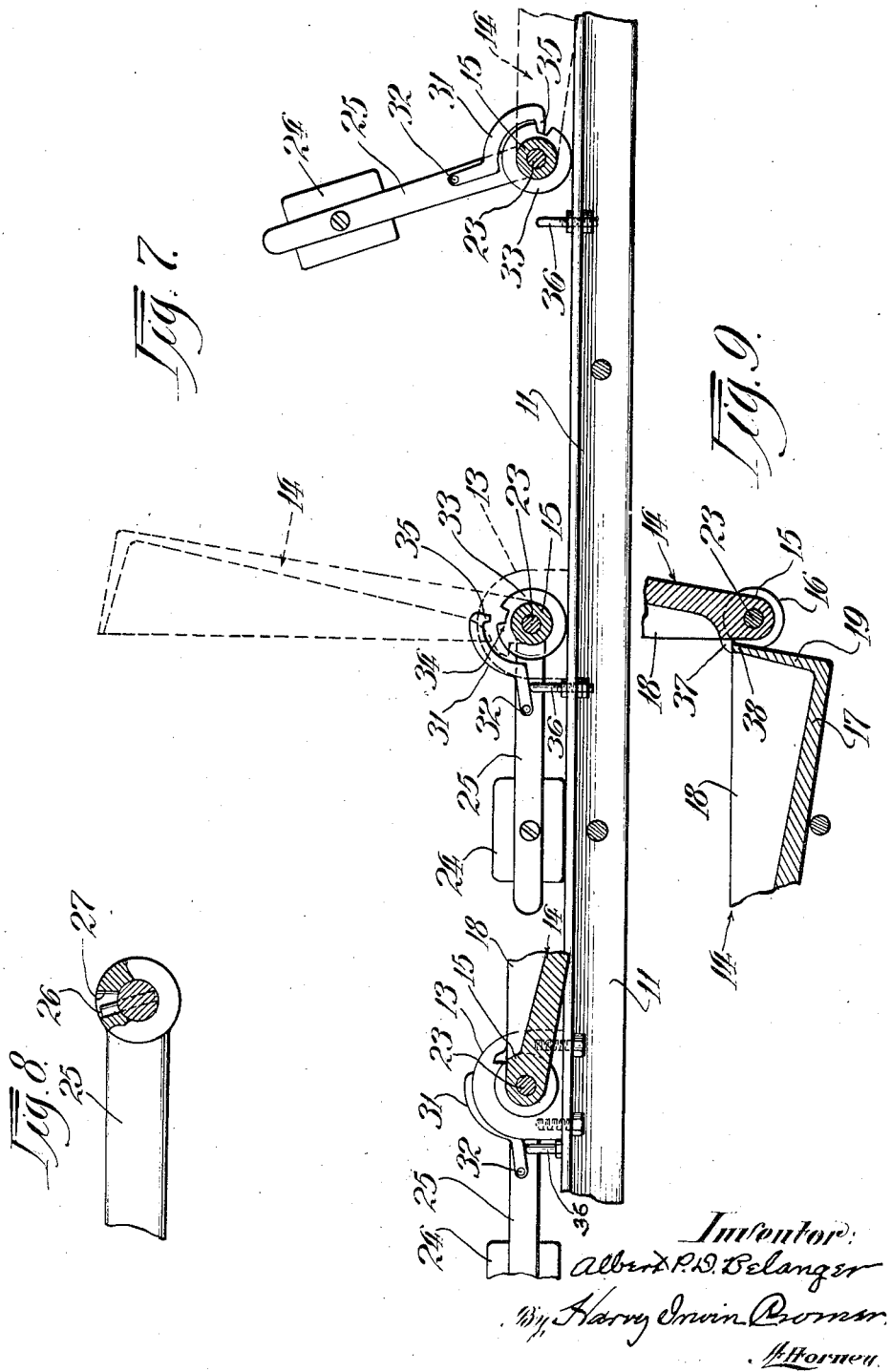

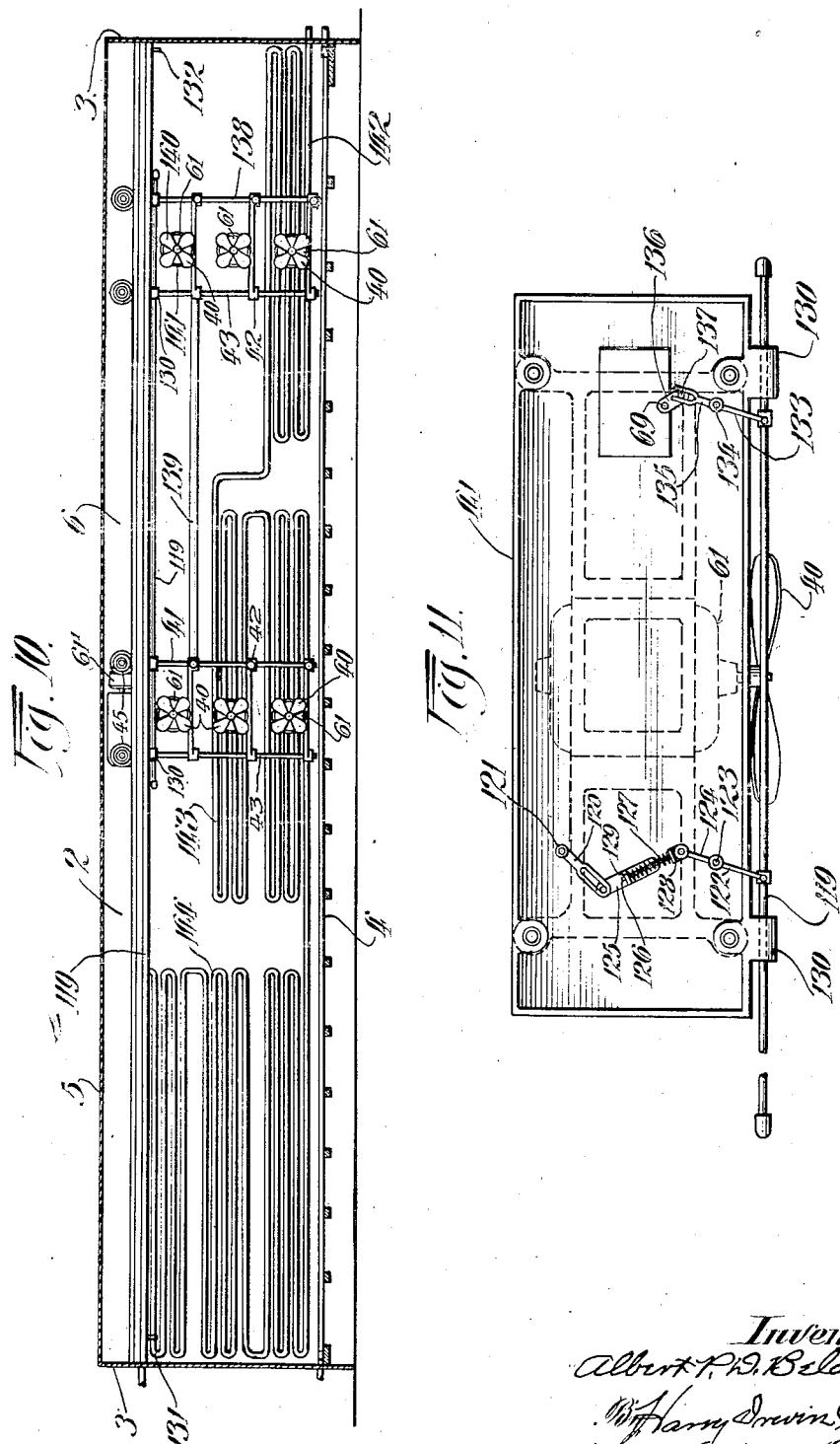

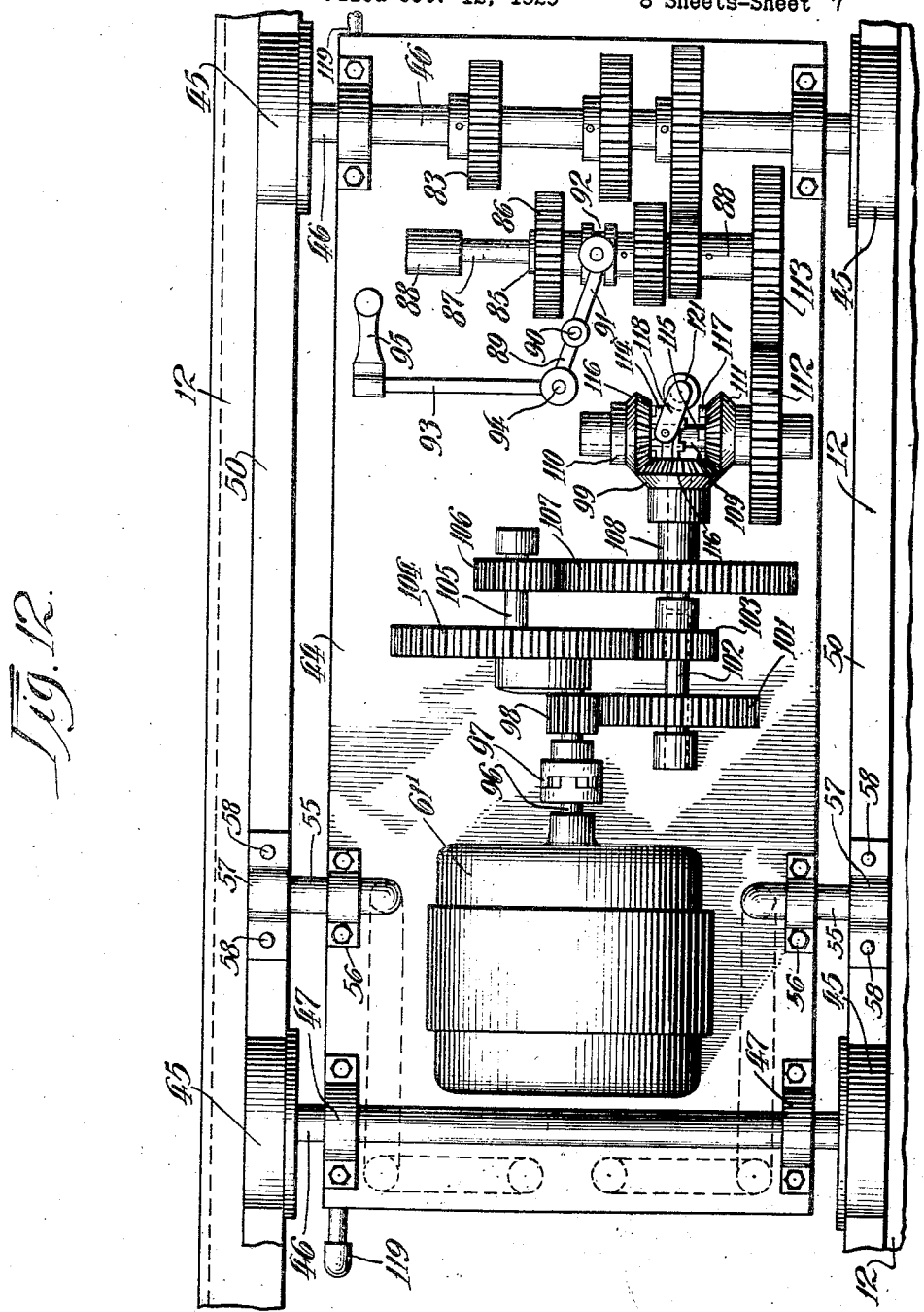

Patented June 21, 1932

1,864,178

UNITED STATES PATENT OFFICE

ALBERT P. D. BELANGER, OF CHICAGO, ILLINOIS

DRIER FOR FOOD PRODUCTS

Application filed October 12, 1929. Serial No. 399,241.

This invention relates to driers and an improved process for drying food products and other articles and materials; and more particularly to continuous driers and an improved process for subjecting a continuous supply of material to continuous progressive treatment by subjecting the material to the action of a moving current or currents of air and to the action of relatively inactive or motionless air alternately and progressively.

The principal object of the invention is to provide an improved simple, economical and efficient drying apparatus and process for drying food products and other articles and materials.

Other important objects of the invention are to provide a continuous drier comprising improved means for subjecting a continuous supply of material to continuous progressive treatment by subjecting the same to the action of a moving current or currents of air applied to the material progressively in such a manner that the material is acted upon intermittently by air in motion and by relatively inactive or motionless air alternately and progressively and for predetermined successive periods of time; to provide means for keeping a continuous supply of material in progressive intermittent motion, and means for turning the material over and feeding the same forward progressively and intermittently and simultaneously subjecting the material to the action of a continuous sheetlike current of air which is being constantly shifted relatively to the material to be treated and the direction of movement of said material.

A further object of the invention is to provide an improved continuous process of drying or treating food products, such for example as noodles or macaroni and other products and materials.

Other and further objects of the invention will appear from the following description and claims, and from an inspection of the accompanying drawings which are made a part hereof.

The invention consists of the improved process and the features, combinations, details of construction and arrangement and mode of operation of the elements and parts as herein described and claimed.

In the accompanying drawings:

Figure 1 is a view in longitudinal vertical section of an improved drying apparatus constructed in accordance with my invention, showing a series of rotative electric fans mounted in superposed relation upon a movable carriage and adjacent to a series of tiltable trays or screens adapted to cause a constant supply of material to be carried through the treating chamber of the apparatus in which said material supplying and feeding means and fans are located;

Fig. 2 is a view in vertical section taken on line 2—2 of Fig. 1 looking in the direction indicated by the arrows, and showing the carriage and series of superposed fans supported thereon in side elevation and the superposed tiltable trays or screens in end elevation in the treating chamber;

Fig. 3 is an enlarged detail plan view of a series of tiltable material-supporting trays or screens showing the rocking shaft and lever mechanism and counterweights for operating the same;

Fig. 4 is a view in side elevation of the mechanism shown in Fig. 3;

Fig. 5 is a detail view in section of one of the levers for operating the rocking hollow shaft and material-supporting trays or screens;

Fig. 6 is a similar view of one of the levers for operating the rock-shafts with which the counterweights are connected;

Fig. 7 is a detail view in vertical section taken on line 7—7 of Fig. 3 looking in the direction indicated by the arrows;

Fig. 8 is a detail view of one of the counterweight-supporting arms showing the same connected with one of the rock-shafts which extends through and in concentric relation to the hollow shafts upon which the tiltable trays or screens are supported;

Fig. 9 is a detail view taken on line 9—9 of Fig. 3 looking in the direction indicated by the arrows, and showing the stopping means for limiting the movement of the tiltable trays or screens;

Fig. 10 is a diagrammatic view in longitudinal vertical section of a drying apparatus or housing provided with heating means and superposed rotative fans supported upon a traveling carriage adapted to support and carry two sets of fans in tandem relation, with the tiltable trays or screens and other parts omitted;

Fig. 11 is an enlarged detail plan view of a fan-supporting carriage constructed in accordance with my invention, and showing the means for automatically stopping and reversing the direction of movement of the carriage;

Fig. 12 is an enlarged plan view in detail of a fan-supporting carriage and driving motor and gear mechanism constructed in accordance with my invention;

Fig. 13 is a view in side elevation of a track for supporting a fan-supporting carriage, and showing the means for connecting the electric motors on said carriage with a source of electric supply through the medium of said track;

Fig. 14 is an enlarged view in transverse vertical section taken on line 14—14 of Fig. 13 looking in the direction indicated by the arrows, and showing the electric connections located on the carriage in end elevation;

Fig. 15 is an enlarged detail view in central section taken through the axial center of one of the insulated carriage-supporting wheels; and Fig. 16 is a diagrammatic view showing the electric circuits and connections for connecting the fan motors and carriage-actuating motor with a source of electric supply, and the means for stopping and reversing the direction of movement of the fan-supporting carriage by means of automatically actuated electric switch mechanism.

In constructing an improved drying apparatus in accordance with this invention, I provide an enclosed frame or housing 1, which comprises side walls 2, end walls 3, a floor 4 and roof or cover 5, all formed of sheet metal, wood, or other suitable building material, and adapted to form a drying or treating chamber 6 having an upper expansion chamber 7 which communicates with and projects upward beyond the top of the main drying chamber. A discharge pipe or flue 8 communicates with and leads from the expansion chamber 7 and is adapted to be connected with and form a part of a flue or other receptacle for receiving and discharging air from the drying and expansion chambers. The frame or housing is provided with suitable doors—not shown—for admitting and permitting the removal of material to be treated, and for affording access to the interior of the frame or housing for any desired purpose.

A material-supporting machine frame 9 is provided, which, in the form shown in the accompanying drawings, comprises stationary upright frame members 10, longitudinal side frame members 11, and longitudinal top frame members 12, all formed, by preference, of angle iron, and adapted to form a rigid stationary frame located within the drying or treating chamber, and of suitable form and dimensions to support the movable or working parts of the drying apparatus or machine and the material to be dried or treated.

The upright side frame members thus provided are arranged in parallel relation to each other within the drying or treating chamber and form a rigid open-work frame which is adapted to support the material to be dried or treated and to permit the material to be progressively subjected to the action of a moving current or currents of air during the operation of drying or treating the same.

Rockingly mounted in suitable bearings 13 is a series of tiltable supporting-trays or screens 14, which are mounted with their axes in parallel relation to each other and in transverse relation to the supporting frame.

Each of the tiltable supporting-trays or screens 14 comprises in its construction a hollow rock shaft 15 which extends transversely across the space between the upright side frames and is rockingly supported at its opposite ends in bearings 13 mounted on the longitudinal side frame members 11, which are, by preference, arranged in pairs in parallel relation to each other on opposite sides of the tray-supporting frame.

Fixed to and adapted to rock or tilt with each of said hollow rock shafts 15 is a tray frame or screen frame 16, having a bottom 17 formed of sheet metal or reticulated material, as desired, according to the character of the material to be operated upon.

The tray bottom is surrounded on three sides by upwardly projecting marginal side flanges 18 and an end flange 19 on the swinging receiving end margins of the tray; and the hinged margin at the hinged discharging end of the tray is formed by the hollow rock shaft 15 to which the tray frame is fixed.

Mounted on the projecting end of the hollow rock shaft 15, which forms the rocking axle of each tray respectively is a tray-actuating rocking lever 20, the hinged end of which surrounds and is attached to the shaft by means of a radial pin 21 anchored in the hollow shaft and adapted to extend into and in movable relation to an elongated peripheral slot 22. The lever is thus adapted to rock with and actuate the shaft and tray; and the pin and slot connection permits a limited lost-motion between the lever and the hollow shaft, the purpose of which will hereinafter more fully appear.

Extending through and in concentric rotative or rocking relation to each hollow shaft or axle 15 is a rock shaft 23, on one end of which is rockingly mounted a counterweight 24 which is adjustably supported upon a counterweight lever arm 25. The hinged or pivoted end of said lever arm surrounds the adjacent projecting end of said rock shaft 23 and is connected with the same by means of a radial projecting pin 26, which is anchored in the rock shaft and extends into and in longitudinally movable relation to an elongated slot 27 in the hinged end of said lever arm. The pin and slot connection thus provides means for permitting a limited lost-motion between the counterweight supporting lever arm and the rock shaft 23. Said rock shaft supports and is adapted to rock with and to actuate said counterweight and its supporting arm concurrently with and relatively to the rocking or tiltable movements of the corresponding tray with which said counterweight is operatively connected, as will herinafter more fully appear. Mounted upon and adapted to rock with and having a limited lost-motion relatively to the opposite projecting end of the counterweight supporting and actuating rock shaft 23 is a counterweight actuating lever arm 28. The hinged or pivoted end of said lever arm surrounds and is connected with the rock shaft 23 by means of a radial pin or boss 29, which is connected with the rock shaft and extends through and in longitudinally movable relation to a circumferentially elongated slot 30 in the hinged end of said lever arm and adapted to permit a limited lost-motion between said lever arm and said counterweight supporting and actuating rock shaft 23. (See Figs. 3, 4, 5, 6, 7 and 8.)

The counterweight actuating rock shaft 23, and the counterweight supported thereon are operatively connected with the hollow rock shaft 15 through which said shaft 23 extends, and with the tray supported on said rock shaft, by means of a pawl 31 which is pivotally supported on the counterweight lever 25 by means of a pivot pin 32 and a toothed or shouldered pawl engaging ratchet member 33 which is fixed to the adjacent end of the hollow rock shaft 15, and provided with a projecting tooth or shoulder 34 adapted to be removably engaged by the hinged end portions 35 of said pawl 31. A stop pin 36 is mounted upon a stationary support in position to engage and automatically release the pawl 31, and thereby release the counterweight 24 and its supporting and actuating rock shaft and lever mechanism from the toothed ratchet member 33 and the hollow rock shaft 15 and the tiltable tray 14 supported on and actuated by said hollow rock shaft, when the tray is rocked or tilted to its raised substantially upright dumping position and concurrently with the discharging of the material from the raised tray to the lowered tray adjacent thereto and adapted to receive the material discharged therefrom. One or more projecting stops or bosses 37 on the hinged margin of each tray or its supporting hollow shaft 15 are adapted to engage the adjacent end margin 38 of the adjacent lowered tray into which material is to be dumped or discharged, for limiting the movement of the tray when it reaches its raised discharging or dumping position concurrently with the releasing of the counterweight 24 and the pawl 23 from engagement with the tray, and its supporting and actuating hollow rock shaft and lever mechanism. (See Figs. 3, 7 and 9.)

There may be any desired number of tiltable trays or screens 14 arranged closely adjacent to each other in a series or row, each in position to receive, when in its lowered position, material discharged from the tray located next adjacent to the swinging end or margin of such lowered tray; and each adapted to discharge material from its hinged end or margin onto the next adjacent tray in consecutive order, so as to cause the material to be moved along intermittently and progressively from tray to tray as the trays are tilted and dumped successively and progressively in the order of their arrangement throughout the series of trays. Definite portions of the material are thus moved or dumped intermittently and progressively from tray to tray while other definite portions of the material are concurrently held stationary upon other trays in their lowered or material receiving position.

I provide, by preference, a plurality of superposed rows of tiltable trays, each containing a plurality of trays tiltably mounted upon parallel axes and adapted to be tilted or dumped consecutively and progressively in the order of their arrangement from end to end of each superposed row or series of trays or screens respectively. The last tray at the end of each superposed row or series is adapted to dump material therefrom onto the first lowered tray of the next lower row or series; and the first tray of each superposed row or series is adapted to receive the material dumped or discharged thereon from the tray located above such receiving tray or from a source of supply of material to be treated. The source of supply and means for introducing a continuous supply of material to the drying or treating chamber and apparatus may be in the form of a feed chute or feed belt, or of any ordinary and well known or suitable form, and, therefore, need not be further described or shown herein.

My improved drier constructed as shown in the accompanying drawings is adapted to be used in the practice of my improved process for drying or treating food products or other materials as herein described and claimed.

In the practice of my improved process, the material is, by preference, subjected to the action of moving currents of air and relatively inactive or motionless air alternately and progressively concurrently with the movement of portions of the material intermittently and progressively; and portions of the material are held stationary while other definite portions are being dumped or carried along intermittently and progressively, and while a continuous supply of said material is being dried or treated progressively by my improved continuous process.

Means is provided for subjecting the material to the action of a moving current or currents of air applied to the material progressively in such a manner that the material is acted upon intermittently by a moving current or currents of air caused to flow through the material concurrently with the operation of raising and loosening and tossing and dumping the material from tray to tray, and by the relatively inactive or motionless air alternately and progressively and for predetermined successive periods of time; and comprises, by preference, a series of rotative electric fans 40, which are mounted upon a travelling fan-supporting carriage 41 in superposed relation to each other and adapted to produce a substantially vertical continuous sheet-like current of air which flows transversely across the material supporting-trays and frame and the material supported thereon. The sheet-like current of air is shifted bodily and progressively at right angles to the direction of the moving air current or currents and concurrently with the intermittent progressive movement of the material as it is carried from end to end of the series of tiltable trays in the operation of drying and treating the material.

The fan supporting-carriage 41 comprises in its construction a depending carriage frame having a plurality of horizontal fan-supporting platforms or frame members 42 arranged in superposed relation to each other and supported upon upright corner frame members 43 which extend through suitable vertical openings in the corners of the fan supporting platforms. The upper ends of the upright frame members 43 are anchored in and supported by the upper horizontal carriage frame member or platform 44. The carriage 41 is provided with flanged supporting wheels 45 mounted upon the ends of transverse axles 46, each of which is journaled in suitable bearings 47 on the upper ends of upright carriage frame members 48 which are fixed to and project upwardly from the main upper horizontal carriage frame member or platform 44. (See Figs. 1, 2 and 12.)

The fan supporting-carriage frame member or platform 44 is mounted upon parallel supporting-tracks 49 each of which comprises, by preference, a metallic electrically conductive upper track member 50 mounted on a supporting base or bottom track 51 formed of wood or other suitable insulating material and rigidly secured to the top horizontal frame member 12 formed of angle iron, as already described, by means of headed bolts 52, or other suitable securing means. (See Figs. 1, 2, 10, 12, 13 and 14.)

Mounted upon and movable with the carriage 41 directly over and in position to yieldingly and slidably engage the metal track-supporting member 50 on each side of the carriage is an electric shoe 53, having a track engaging contact member 54 formed of carbon or other suitable electrically conductive material. The shoe 53 is supported upon the carriage by means of a horizontal tubular supporting member 55 formed of bakelite or other suitable insulating material, one end of said tubular member being fixed to an upright supporting frame member 56 on the carriage; and the other end of said tubular member being fixed to an upper shoe member 57. The electrically conductive shoe member 53 is attached to the upper shoe member 57 by means of a pair of upright pins 58 which are anchored in and project upwardly from the shoe member 53 through suitable openings in end flanges 59 on the upper shoe member 57; and compression springs 60 are interposed between the shoe members 53 and 57, and are held in place by the upright connecting pins 58 which are encircled by said springs. (See Figs. 13 and 14.)

One of the contact members 54 and its electrically conductive shoe member 53 is electrically connected with the fan motors 61 of the respective electric fans 40 and with the carriage driving motor 61' on the carriage platform 44 by a conductor wire 62 and branch wires 63 each of which is connected with a brush 64 and a corresponding pole 65 forming the usual connection with an armature 66 of a corresponding motor 61 or 61' as the case may be. The other electric contact member 54 and its electrically conductive supporting shoe member 53 is connected with the opposite poles 67 of the respective motors 61 and 61' by a conductor wire 68, one end of which is connected with said contact shoe members 53 and 54; and the other end of which is connected with a movable switch member 69. Said switch member, when in circuit closing position, is adapted to engage a stationary switch contact member 70, said contact 70 being connected with the fan motors 61 by branch wires 71 which lead to the poles 67 of the respective fan motors 61 and to the brushes 72 connected with said poles and adapted to engage the armatures 66 of the fan motors. The branch wire 73 serves to connect the conductor or feed wire 68 with the pole 74 and the brush 75 of the carriage driving motor 61'.

One of the electrically conductive track members 50 is connected with a positive line wire 76 by a wire 77 and the main line switch 78 which is interposed between the feed wires 76 and 77.

The electrically conductive track member 50 of the other track member 49 is connected by a connecting wire 80 which leads from said track member to the main line switch. (See Figs. 13, 14 and 16.)

The peripheral metallic rims of the carriage supporting-wheels 45 are insulated from the hubs 81 and from the axles 46 and fan supporting-carriage by annular webs 82 formed of bakelite or other suitable insulating material and interposed between said wheel flanges and hubs. (See Fig. 15.)

The horizontal track rails 12 upon which the carriage is supported and adapted to travel from end to end of the superposed horizontal rows of tiltable trays or screens, are mounted at one side of and, by preference, above the level of the top-most series or row of tiltable trays; and the suspended fan-supporting carriage frame extends downward between and below the level of the carriage-supporting track adjacent to longitudinal side margins of the superposed rows of tiltable trays and carries with it a series of superposed electric fans each of which is, by preference, supported on said carriage frame adjacent to and in or near the same horizontal plane with a corresponding row of tiltable trays. The axis of rotation of each fan is thus, by preference, located in substantially the same horizontal plane with a corresponding adjacent row of tiltable trays and each set of fan blades is adapted to propel a current of air transversely across the corresponding adjacent row of tiltable trays and across and through the material supported on and carried from tray to tray. The current or currents of air thus produced by the superposed fans is comparatively narrow or sheet-like in form and of such height and depth that the bottom of the current is, by preference, below the level of the lowermost superposed row of tiltable trays, and the top of the carriage is above the level of the top row of said trays; and the current flows transversely across and through the series of superposed trays and the material supported thereon, and upward on the opposite side of the drying chamber and tiltable trays into the said expansion chamber 7, already described.

Means is provided for operatively connecting the carriage driving motor 61' with the carriage supporting wheels 45, and for starting, stopping and changing the direction of movement of the fan supporting carriage and for changing and controlling the speed of movement of the carriage, as follows:

Fixed to one of the rotative axles 46 on the fan supporting carriage is a series of speed-changing gears 83; and fixed to and adapted to rotate with the hollow shaft or sleeve 85 is a series of speed-changing gears 86 which are adapted to shift into and out of toothed engagement with the gears 83 on the axle 46, for changing the speed of rotation of said axle and the carriage supporting wheels 45 relatively to the speed of operation of the carriage driving motor 61'. The gear supporting hollow shaft or sleeve 85 is rotatively supported upon and movable longitudinally of a stationary stub shaft 87 which is supported upon stationary bearings 88 on the carriage platform 34 in parallel relation to the axle 46.

Suitable gear shifting mechanism is provided which comprises an oscillating lever 89 pivotally mounted on an upright pivot pin 90, and provided with forked yoke arms 91 which are adapted to operatively engage the circumferential slot 92 in the periphery of the hollow shaft or sleeve 85 on which said gears 86 are mounted.

Actuating means, which may be of any ordinary or suitable form, is connected with the gear shifting lever 89 and comprises, by preference, a connecting rod 93, having one end connected with said lever 89 by a pivot pin 94; and the opposite end of said connecting rod being attached to and adapted to be operated by a lever 95, or other suitable operating means. (See Fig. 12.)

Fixed to the motor shaft 96 by means of a flexible coupling 97 is a spur pinion 98 which is operatively connected with a driving beveled gear wheel 99 by means of a suitable train of gears 100 which comprise a spur gear wheel 101 on a rotative shaft 102 and in toothed engagement with the pinion 98 on the motor shaft, a spur gear wheel 103 fixed to said shaft 102 and in toothed engagement with a spur gear wheel 104 fixed to a rotative shaft 105 and provided with a spur pinion 106 which is in toothed engagement with a spur gear wheel 107 fixed to a rotative shaft 108 on which said beveled gear wheel 99 is mounted.

Loosely mounted on a rotative stub shaft 109 is a pair of beveled gear wheels 110 and 111. The gear wheel 111 is fixed to a spur gear 112, which is in toothed engagement with a spur gear wheel 113 mounted on and adapted to rotate with the hollow shaft or sleeve 85 which supports the speed-changing gears 86, already described. A movable clutch member 114 is mounted upon and in longitudinally slidable relation to the stub shaft 109 with which said clutch member is slidably connected by means of a spline key 115 seated in said shaft and adapted to slidably engage an elongated slot in said clutch member. The clutch member 44 is provided with the usual clutch shoulders 116 which are adapted to be moved into and out of clutching engagement with clutch shoulders 117 on the beveled gear wheels 110 and 111 alternately, for reversing the direction of rotation of the driving gear 112 and the speed changing gear mechanism and carriage supporting wheels connected therewith and driven thereby. A clutch actuating yoke 118 is mounted in operative engagement with the movable clutch member 114 and operatively connected with a stopping and reversing clutch actuating rod 119 by means of a lever arm 120 fixed to an upright shaft 121 to which the clutch-actuating yoke 118 is fixed. A lever 122 is mounted upon an upright supporting pivot pin 123 and provided with a lever arm 124 which is operatively connected with the lever arm 120 by means of a connecting link 125 and a spring-pressed bolt 126, one end of which is connected with the lever arm 124, and the other end being connected with said link, said bolt being surrounded by a compression spring 127 mounted between the bolt head 128 and a perforated boss 129 on said link, and adapted to provide the desired resilient flexible connection between said lever 120 and the lever arm 124. The other arm of the lever 122 is operatively connected with the oscillating stopping and reversing rod 119 which is slidably mounted in suitable bearings 130 on the fan carriage 41. The stopping and reversing rod 119 projects endwise in opposite directions beyond its supporting bearings 130 on the carriage, and is adapted to be moved and carried with the carriage into position to be engaged and tripped by a stationary tripping stop 131 when the fan carriage reaches the limit of its path of movement in one direction, and to engage and be operated by a similar tripping stop 132 when the fan carriage reaches the limit of its path of movement in an opposite direction longitudinally of the superposed rows of tiltable trays.

The stopping and reversing rod 119 is operatively connected with the movable electric switch member 69, already described, by a switch actuating lever 133 which is pivotally mounted upon an upright pivot pin 134 on the fan carriage 41. A forked arm 135 on said lever is operatively connected with the movable switch member 69 by means of a lever arm 136 attached to said movable switch member and having a crank pin 137 on said lever arm 136 and in engagement with and adapted to be operated by said forked lever arm 135. The stopping and starting rod 119 is thus operatively connected with and adapted to operate the reversing gear mechanism and the electric switch mechanism on the fan carriage simultaneously, and concurrently with the movement of the fan carriage to the limit of its path of movement and the stopping and reversing of the carriage at the end of its path of movement in opposite directions alternately.

In Fig. 10 is shown an auxiliary or tandem fan-supporting carriage 138 which is, by preference, identical in all respects with the fan-supporting carriage 41, already described, and is rigidly connected with the latter by one or more connecting rods 139, or other suitable connecting means adapted to hold said fan-supporting carriage 41 and auxiliary fan-supporting carriage in fixed and spaced apart relation to each other. The auxiliary fan supporting carriage 138 is provided with electric fans 140 which are, by preference, identical with the electric fans 40, already described; and said fans 140 are provided with electric motors 141 which are electrically connected with the motors 61 and with the same source of electric supply and are adapted to be stopped and started and kept in operation concurrently with the stopping and starting and controlling of the fans 40 and fan motors 61, already described. The fan carriage 131 is adapted to be driven by the carriage driving motor 61' and fan carriage 41. The tandem fan carriages, or spaced-apart suspended carriage frames, each having a set of superposed electric fans thereon are thus adapted to produce a plurality of parallel currents of air which flow transversely across and through the superposed rows of tiltable trays and the material supported thereon, the spaced-apart currents of air being narrow and sheet-like in form and being shifted bodily in a direction at right angles to the direction in which the currents of air flow from said fans across and through said material to be dried or treated.

In the drier shown in Fig. 10 means is provided for heating the drying or treating chamber 6 by means of a plurality of connecting steam heating coils 142, 143 and 144 of different progressively increasing lengths and having different progressively increasing areas of radiation and heating surfaces in the order of their arrangement lengthwise of the treating chamber. The heating coils are thus adapted to heat the drying or treating chamber in sections having different temperatures, the temperature of each section being higher than that of the next adjacent section in one direction, and lower than that of the next adjacent section in an opposite direction lengthwise of the path of movement of the fan carriage and fans and adapted to subject the material to be dried and treated to a progressively increasing degree of temperature as the material is carried in one direction, and to a correspondingly decreasing temperature as the material is carried in an opposite direction within the drying or treating chamber.

The fan-supporting carriage 41 and auxiliary carriage frame 138 are each provided with a plurality of tripping and actuating fingers or bosses 145 each having an antifriction roller 146 thereon adapted to engage and trip and operate the tray-actuating levers 20 and the counterweight-actuating levers 28 to operate the counterweights and tilt the tiltable trays successively and progressively.

There is one of said actuating and tripping fingers for each of the superposed rows of tiltable trays; and each of said fingers or bosses is adapted to engage and operate the tray-actuating levers 20 and the trays or screens 14 associated therewith, and the counterweight-actuating levers 28 and counterweights connected therewith, for tilting the respective trays or screens from lowered material receiving and supporting position to raised dumping position during the movement of the fan-carriage and fans in one direction longitudinally of the superposed rows of tiltable trays, and for tilting or rocking the counterweights 24 to raised position and into releasable engagement with the corresponding tiltable trays associated therewith progressively in successive order during the movement of the fan-carriage and fans in an opposite direction longitudinally of the superposed rows of tiltable trays or screens.

The apparatus above described is well adapted for use in the practice of my improved process of drying or treating food products, such, for example, as noodles, macaroni, fruits, vegetables, cereals and other food products and materials, and drying or treating soap-flakes, tobacco, and any and all kinds of other animal and vegetable substances, and materials to be dried or treated by being intermittently subjected to the action of a current or currents of air and relatively inactive or stationary air alternately and progressively.

In drying or treating food products or other material or substances by and in accordance with my improved process, the material to be dried or treated is introduced into the treating chamber continuously and progressively, and progressively spread upon the tiltable trays or material-supporting means within the drying or treating chamber, by preference, in superposed spaced-apart layers, there being, by preference, a layer of material to be dried or treated deposited upon each of a plurality of superposed rows of tiltable trays, each of said rows comprising a series of trays or screens tiltably mounted on parallel axes and each adapted to alternately support material thereon in stationary position and move or dump said material onto the next adjacent tray progressively.

The material contained in the superposed layers supported on the tiltable trays comprises definite portions, each of which is supported upon a corresponding tiltable tray or other support and intermittently moved progressively concurrently with and during the holding of other definite portions of said material stationary. The material to be dried or treated is also subjected intermittently to the action of a current of air progressively applied to all of the superposed layers of said material concurrently with the intermittent movement of definite portions of said material progressively in successive order, and concurrently with the maintenance or holding of other definite portions of said material stationary. The material is, by preference, subjected to the action of the moving current of air simultaneously with the movement or tossing and dumping of the definite portions of the material into or onto which the current of air is caused to flow and while the particles of moving material are separated, and concurrently with the holding of other definite portions of said material stationary. Although the material is intermittently subjected to the action of air in motion in the form of a sheet-like current of air which flows transversely across and in contact with the material and which current is shifted progressively longitudinally of the layers of material to be treated, the current of air which flows into contact with the material is continuous. And by the shifting of the current every portion of the material is intermittently acted upon by the moving air and also intermittently acted upon by a relatively inactive or stationary body of air alternately and progressively. Moisture is thus caused to exude from the interior of and to accumulate upon the surface of the material during the periods in which the material is subjected to the action of relatively inactive or stationary air; and the moisture is removed from the surface of the material and carried away through the expansion chamber which communicates with the treating chamber and through the outlet passage or flue by and during the periods in which the material is subjected to the action of the current of air flowing across and in contact with the material progressively. It should be noted that by intermittently moving definite portions of the superposed layers of material progressively concurrently with the maintenance or holding of other definite portions of said material stationary, and by intermittently subjecting definite portions of said material to the action of a moving current of air caused to flow across and in contact with said material and, by preference, caused to flow in contact with the moving portions of the material, and concurrently subjecting other definite stationary portions of the material to the action of relatively inactive or stationary air, the desired alternate periods of exudation and accumulation of moisture on the surface of the material and periods of removal and discharge of moisture from the material and the desirable effects and results of such treatment are obtained together with and accompanied by all of the practical advantages of a continuous process employed in the treatment of a continuous supply of material, and by a continuous current of air progressively applied to the material in such a manner that the said material so treated is uniformly dried and of uniform and superior quality. Heat is applied as and to the extent required according to the character of the material.

My improved process as herein described and claimed, and my improved drier apparatus for carrying out and practicing said process are economical and efficient in operation. The time required to obtain the desired results, and the power and labor required in the handling and treating of the material are minimized, and a uniform and superior product is obtained.

In case the fans are to be continuously rotated, the stationary switch contact 70 is connected by a wire 70' with a second stationary switch contact 71' located in position to be engaged by the movable switch member 69 when the latter is reversed by the operation of the switch-actuating carriage-reversing rod 119 on the carriage concurrently with the reversing of the direction of movement of the carriage.

By omitting the connection 70' between said contacts 70 and 71' the fans will be rotated intermittently or during alternate movements of the carriage, and will remain idle during the reverse movements of the carriage in an opposite direction.

I claim:

1. In a drier, a housing provided with a treating chamber adapted to contain material to be treated, means for supporting said material in position to be treated within said chamber, means for intermittently moving definite portions of said material progressively in successive order, means associated with said last-mentioned means adapted to cause other definite portions of said material to remain stationary concurrently with said movements of said intermittently moving portions of said material, means for causing a current of air to flow in contact with definite portions of said material periodically in consecutive order concurrently with the movement of said intermittently moving portions of said material and means for limiting the flow of said current of air in contact with said definite portions respectively to definite periods.

2. In a drier, a housing provided with a treating chamber adapted to contain material to be treated, means for supporting said material in superposed layers within said chamber, means for intermittently moving definite portions of said material progressively in successive order, said means including means for holding other portions of said material stationary concurrently with said movements of said intermittently moving portions of said material, means for directing a current of air against definite moving portions of said material during successive periods, and means for limiting the flow of said current of air in contact with said definite portions of material respectively to definite periods.

3. In a drier, a series of tiltable trays mounted adjacent to each other upon parallel horizontal axes, each of said trays being adapted to support material to be treated, means for tilting each of said trays from lowered material supporting position to raised dumping position consecutively, and means for causing a current of air to flow across said trays and in contact with said material.

4. In a drier, a series of tiltable trays mounted adjacent to each other and adapted to support material to be treated, means for tilting said trays from lowered material-supporting position to raised dumping position in consecutive order, for causing said material to be intermittently moved progressively along said series of tiltable trays, and means movable longitudinally of said series of trays and adapted to cause a current of air to flow across and in contact with definite portions of said material during definite periods concurrently with the tilting of said trays and the dumping of said material supported thereon, said means including means for limiting the flow of air in contact with said definite portions of said material to definite periods.

5. In a drier, a series of tiltable trays mounted in movable relation to each other on parallel supporting axes and adapted to support material to be treated, means for tilting said trays from lowered material-supporting position to raised dumping position in consecutive order and adapted to cause definite portions of said material to move intermittently and progressively, means for causing a current of air to flow across and in contact with said material, said means including means for shifting said current of air progressively in a direction lengthwise of the series of tiltable trays concurrently with the flow of air into contact with said material and means for limiting the flow of air in contact with definite portions of said material to definite periods.

6. In a drier, a series of tiltable trays mounted in tiltable relation to each other on parallel supporting axes and adapted to support material to be treated, means for tilting said trays from lowered material-supporting position to raised dumping position progressively in successive order, for causing said material to be moved progressively, means for causing a current of air to flow in contact with said material, said means including means for shifting said current of air progressively in a direction lengthwise of the series of tiltable trays concurrently with the flow of air in said current across and in contact with said material and concurrently with the progressive tilting of the trays, and means for limiting the flow of said current of air to definite portions of said material successively.

7. In a drier, a series of tiltable trays mounted in tiltable relation to each other on parallel supporting axes and adapted to support material to be treated, a counterweight and counterweight-supporting and actuating rock shaft associated with and adapted to rock in concentric relation to the axis of each of said trays respectively, means for releasably connecting each of said counterweights and counterweight-supporting and actuating rock shafts with the tray associated therewith, means for rocking each of said trays and the counterweight and counterweight-supporting and actuating rock shaft associated therewith in unison in one direction for dumping material from said tray to the next adjacent tray progressively in successive order, means for operating said counterweights and counterweight-supporting and actuating rock shafts in an opposite direction in successive order independently of the trays associated therewith, means for releasing and permitting the movement of the trays to initial material-receiving position independently of said counterweights, and means for directing a current of air against said material for drying the same.

8. In a drier, a series of tiltable trays mounted in tiltable relation to each other on parallel supporting axes, and adapted to support material to be treated, a counterweight and counterweight-supporting and actuating rock shaft associated with and rockingly supported in concentric relation to the axis of each of said trays respectively, means for releasably connecting each of said counterweights and its supporting and actuating rock shaft with the tray associated therewith, means for tilting each of said trays and the counterweight and counterweight-supporting rock shaft associated therewith in unison in one direction for raising and dumping material from said tray onto the next adjacent tray in successive order, means for rocking said counterweights and their supporting rock-shafts in an opposite direction to raised position independently of the trays associated therewith respectively, means for releasing and permitting the movement of the trays to initial material-receiving position independently of said counterweights, and means for causing a current of air to flow across and in contact with said material concurrently with the tilting of the trays and the dumping of the material progressively from tray to tray.

9. In a drier, a series of tiltable trays mounted adjacent to each other on parallel supporting axes and adapted to support material to be treated, a tray-actuating lever connected with each of said trays respectively, a counterweight and counterweight-supporting and actuating rock shaft associated with and adapted to rock in concentric relation to the axis of each of said tiltable trays respectively, a counterweight-actuating lever connected with each of said counterweight-supporting and actuating rock shafts respectively, means for releasably connecting each of said counterweights and counterweight-supporting and actuating rock shafts with the tiltable tray associated therewith respectively, means for operating each of said counterweight-actuating levers independently of the tray-actuating lever associated therewith for lifting said counterweights to raised position independently of said tiltable trays, means movable into and out of engagement with said tray-actuating levers successively for tilting said trays successively to raised dumping position in unison with the downward movement of the counterweight associated therewith to effect the dumping of the material progressively from tray to tray in successive order, whereby the material is caused to move intermittently and progressively from end to end of the series of trays, and means for directing a current of air against successive definite portions of said material in successive order.

10. In a drier, a series of tiltable trays mounted adjacent to each other on parallel supporting axes and adapted to support material to be treated, a tray-actuating lever connected with each of said trays respectively, a counterweight and counterweight-supporting and actuating rock shaft associated with and adapted to rock in concentric relation to the axis of each of said tiltable trays respectively, a counterweight-actuating lever connected with each of said counterweight-supporting and actuating rock shafts respectively, means for releasably connecting each of said counterweights and counterweight-supporting and actuating rock shafts with the tiltable tray associated therewith, means for operating each of said counterweight-actuating levers and counterweights in one direction independently of said tiltable tray associated therewith, means for tilting each of said trays to raised dumping position successively in unison with the downward movement of the counterweight associated therewith for dumping material onto the next adjacent tray, means for releasing and permitting the movement of the trays to initial material-receiving position independently of the counterweights, and means for causing a current of air to flow across and in contact with said material concurrently with the tilting of the trays respectively in the operation of dumping said material.

11. In a drier, a series of tiltable trays mounted adjacent to each other on parallel supporting axes and adapted to support material to be treated, a tray-actuating lever connected with each of said trays respectively, a counterweight and counterweight-supporting and actuating rock shaft associated with and adapted to rock in concentric relation to the axis of each of said tiltable trays respectively, means for releasably connecting each of said counterweights and counterweight-supporting and actuating rock shafts with the tiltable tray associated therewith, a fan-supporting carriage mounted adjacent to and adapted to travel longitudinally of said series of tiltable trays, a series of electric fans supported upon said carriage and adapted to cause a current of air to flow across and in contact with the material to be treated upon said trays, and means for operating said tray-actuating levers and said counterweight-actuating levers and counterweights to effect the tilting of the trays in progressive order concurrently with the movement of said carriage and the fans supported thereon.

12. In a drier, a plurality of superposed rows of tiltable trays, each of said rows comprising a series of tiltable trays mounted adjacent to each other on parallel axes and adapted to support a layer of material to be treated, a tray-actuating rocking lever connected with each of said tiltable trays respectively, for tilting the same to dumping position, a fan-supporting carriage mounted adjacent to and movable longitudinally of said rows of tiltable trays, means for driving said carriage, a series of superposed rotative electric fans mounted on said carriage, said fans being adapted to cause a current of air to flow across and in contact with said layers of material on said tiltable trays concurrently with the movement of said carriage and fans longitudinally of the superposed rows of trays, and means on said fan-supporting carriage and adapted to operatively engage said tray-actuating levers for operating said levers to effect the tilting of the trays to dumping position progressively in successive order.

13. In a drier, a plurality of superposed rows of tiltable trays, each of said rows comprising a series of trays tiltably mounted adjacent to each other upon parallel axes and adapted to support material to be treated, a tray-actuating lever connected with each of said tiltable trays respectively, for tilting the same to dumping position, a counterweight and counterweight rock shaft associated with and rockingly mounted in concentric relation to the axis of each of said tiltable trays respectively, a counterweight-actuating lever connected with each of said counterweight-supporting rock shafts for operating the same, means for releasably connecting each of said counterweights and counterweight-supporting rock shafts with the adjacent tiltable tray associated therewith, means for automatically releasing said connections in predetermined order, means adapted to operatively engage said tray-actuating levers and said counterweight-actuating levers respectively for tilting the trays to effect the dumping of said material progressively concurrently with the movement of said trays, and means for passing a current of air against definite portions of said material successively for definite periods for drying said material.

14. In a drier, a treating chamber, a series of tiltable trays mounted in said chamber adjacent to each other on parallel supporting axes and adapted to support material to be treated, a tray-actuating lever connected with each of said trays respectively, a counterweight and counterweight-supporting rock shaft and actuating lever associated with and adapted to tilt in concentric relation to the axis of each of said tiltable trays respectively, means for releasably connecting each of said counterweights and counterweight-supporting and actuating rock shafts with a tiltable tray associated therewith, means for automatically releasing said connections successively, a fan-supporting carriage mounted adjacent to and adapted to travel longitudinally of said series of tiltable trays, a series of rotative electric fans supported upon said carriage and adapted to cause a current of air to flow across said trays and in contact with material to be treated upon said trays, means for connecting said fans with a source of electric supply, means mounted on and movable with said fan-supporting carriage and adapted to engage and operate said tray-actuating levers and said counterweight-supporting and actuating rock-shafts and levers for dumping material from each of said trays onto the next adjacent tray progressively in successive order, means for operating the counterweights and counterweight-supporting rock-shafts and levers in one direction independently of the trays, and means for driving said fan-supporting carriage.

Signed at Chicago, in the county of Cook and State of Illinois, this 1st day of October, 1929.

ALBERT P. D. BELANGER.